UNITED STATES PATENT OFFICE.

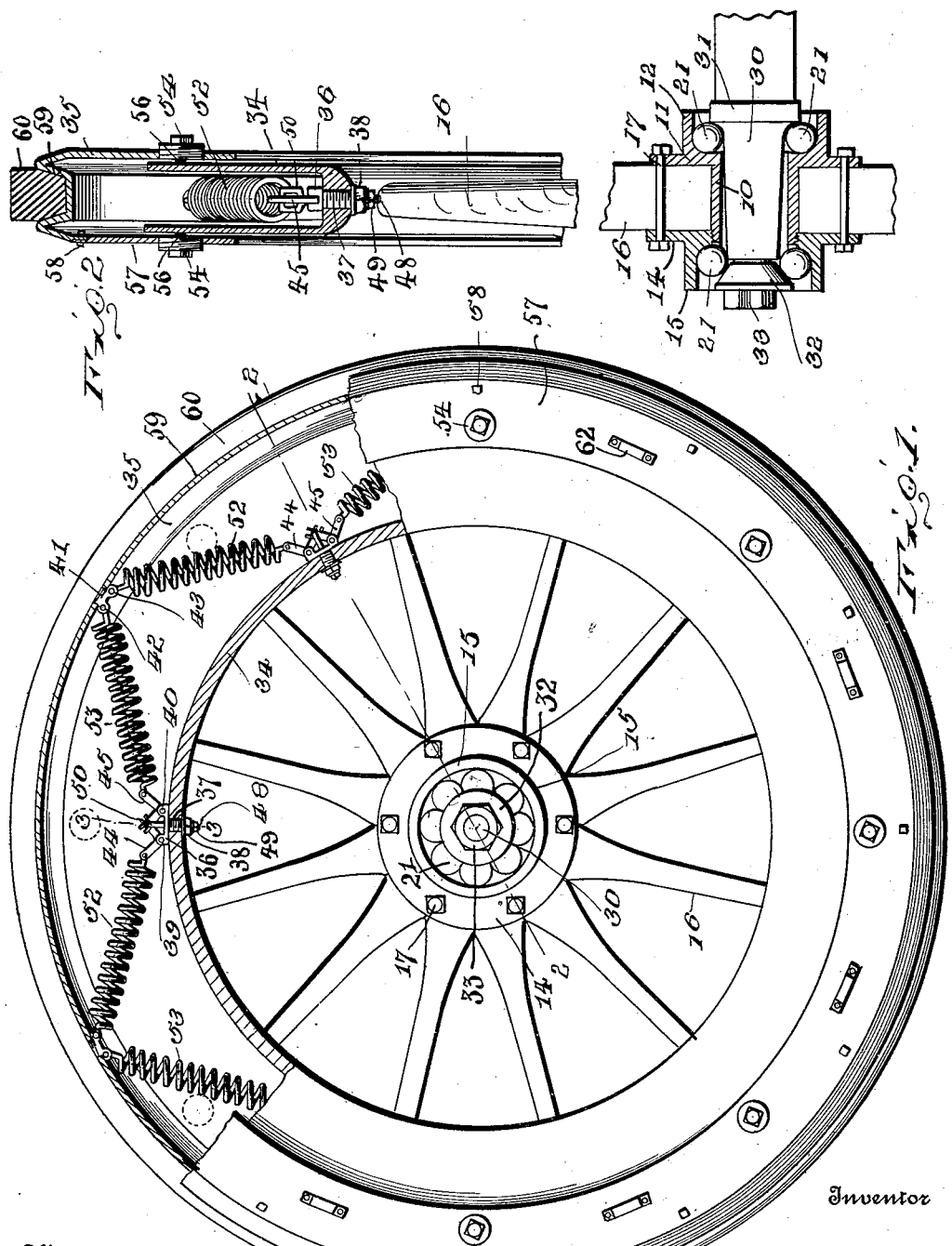

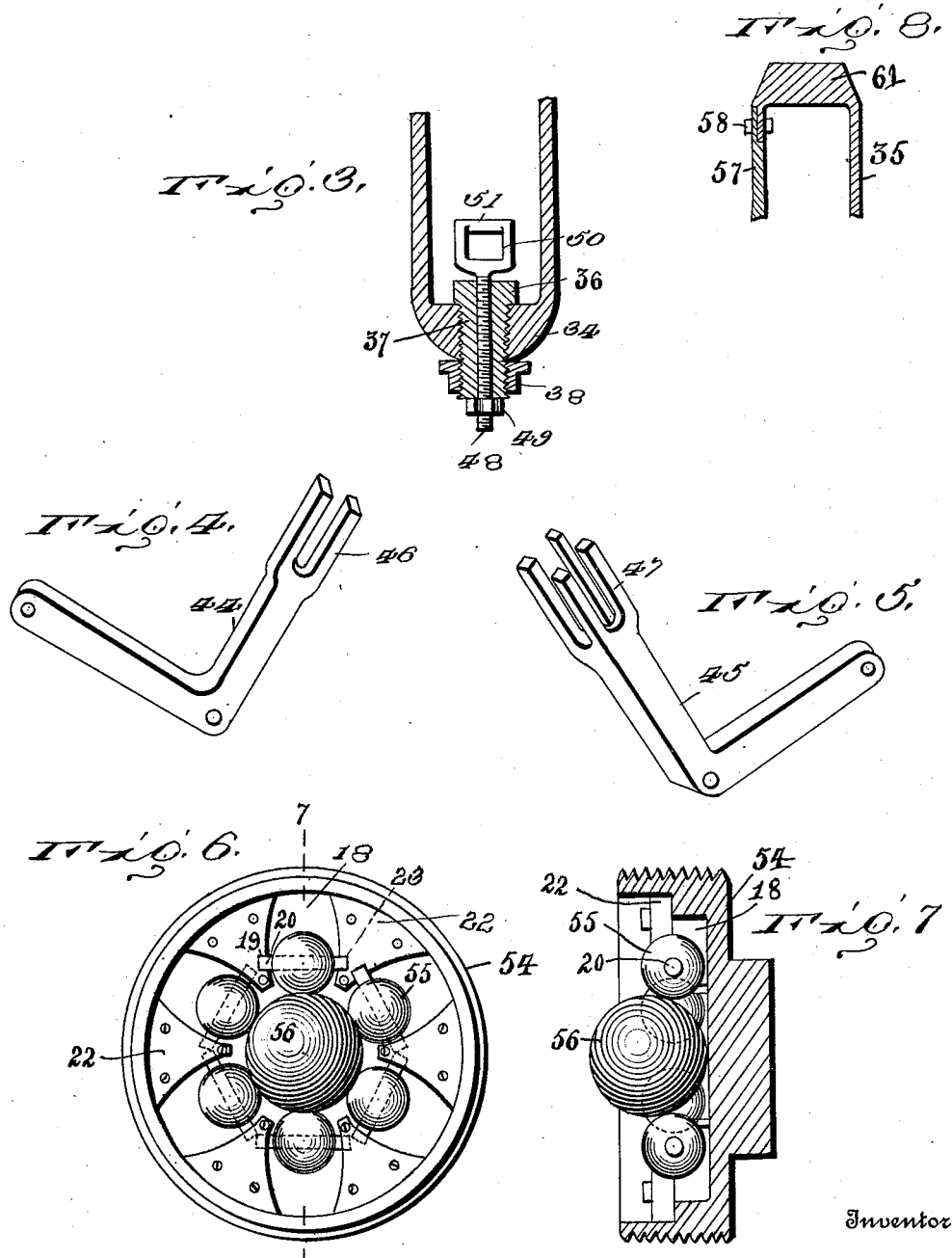

GUNDER B. LIVINGSTON, OF BURLINGTON, NORTH DAKOTA.

SPRING-WHEEL.

1,007,121.  Specification of Letters Patent.  Patented Oct. 31, 1911.

Application filed December 14, 1910. Serial No. 597,292.

*To all whom it may concern:*

Be it known that I, GUNDER B. LIVINGSTON, citizen of the United States, residing at Burlington, in the county of Ward and State of North Dakota, have invented certain new and useful Improvements in Spring-Wheels, of which the following is a specification.

This invention relates to improvements in wheels, more particularly of the class of spring wheels having yieldable rims, and has for one of its objects to improve the construction and increase the efficiency and utility of devices of this character.

Another object of the invention is to provide a device of this character wherein a plurality of springs are arranged between the rim and the hub, and with means for adjusting the springs to control the tension, and likewise to correct inequalities in the rim.

Another object of the invention is to provide a wheel of this character having an improved construction of hub, in which provision is made for readily detaching any broken or impaired parts without the necessity for interfering with or disturbing the remaining parts.

Another object of the invention is to provide a wheel having a detachable covering device for the rim and the springs connected therewith and which may be readily attached or detached without disturbing the remaining portions of the wheel.

Another object of the invention is to provide means for attaching a separate bearing tire to the casing which may be of any suitable material, and may be changed without detaching other parts.

With these and other objects in view the invention consists in certain novel features of construction as hereinafter shown and described and then specifically pointed out in the claims; and, in the drawings illustrative of the preferred embodiment of the invention, Figure 1 is a side elevation of the improved wheel, partly in section; Fig. 2 is a section enlarged on the line 2—2 of Fig. 1; Fig. 3 is a sectional detail, enlarged, on the line 3—3 of Fig. 1; Figs. 4 and 5 are enlarged perspective views of the bell crank tension levers, detached; Fig. 6 is a side view, enlarged, of one of the anti-friction devices of the rim with the balls in position; Fig. 7 is a section on the line 7—7 of Fig. 6; Fig. 8 is an enlarged section of a portion of the rim, illustrating a modification in the construction.

Corresponding and like parts are referred to in the following description and indicated in all the views of the accompanying drawings by the same reference characters.

The improved device embraces in its construction a hub "box" including an inner cylindrical portion 10 and an annular flange 11, and an integral sleeve 12 extending outwardly from the flange, the members 10—11—12 being preferably formed in one single casting, as shown in Fig. 2, the sleeve 12 being arranged to extend inwardly or toward the body of the vehicle. The outer end of the cylindrical portion 10 of the hub is provided with a threaded portion, and engaging this threaded portion is an outer flange or annular plate 14, the latter being provided with an outwardly directed sleeve 15, the two sleeves 12—15 corresponding closely in shape and size. The spokes of the wheel, represented at 16, are located between the flanges 11—14 and secured therein by bolts 17 extending through the two flanges and in recesses in the spokes.

Formed within the sleeve 12 are annular seats to receive bearing balls 21, the balls being held in position by a collar 31 and a cone 32 on the axle journal 30, the cone being further supported by a holding nut 33.

The spokes 16 are connected to an inner rim 34 which is U-shape transversely, preferably of metal and as light as possible consistent with the strains to which it will be subjected. Surrounding the inner rim 34 is an outer rim 35, also U-shape transversely, with its sides overlapping the sides of the inner rim, as shown. The rim 35 corresponds in diameter with the ordinary wheel of a vehicle.

When the improved device is employed upon an automobile the rim 35 will generally equal in diameter the ordinary wheel of an automobile, while the rim 34 will be somewhat smaller, as shown in Fig. 1. When the improved wheel is employed upon ordinary vehicles, such as carriages, buggies, and wagons, the rim 35 will generally correspond in diameter with the ordinary wheel of a vehicle, but it will be understood that it is not desired to limit the sizes of the parts 34—35 in any way, as these parts may be of any required size to suit the circumstances under which the wheel is employed.

Bearing upon the outer face of the inner rim 34 at suitable intervals are a plurality of plates 36, each plate having a tubular threaded stud 37 extending through the rim and provided with a clamp nut 38 which bears against the inner face of the inner rim and thus secures the members 36 in position. Any required number of the members 36 may be employed, but preferably one-half as many of the plates will be employed as there are spokes 16, or with one of the members 36 located midway between each alternate pair of the spokes, as shown in Fig. 1. At its end each member 36 is provided with perforated ears 39—40, the object to be hereafter explained. Connected to the rim 35, preferably by being threaded therethrough, are a plurality of spring supporting devices 41, and each provided with spaced apertures 42—43.

Mounted to swing at its elbow between the ears 39 is a bell crank lever 44, while a similar bell crank lever 45 is mounted to swing at its elbow between the ears 40. The terminal of one arm of the bell crank lever 44 is forked in one direction, as shown at 46, while the terminal of the corresponding arm of the bell crank lever 45 is also forked in both directions, as shown at 47, the forks 46 of the lever 44 being designed to operate between one pair of the forks 47 of the lever 45, as shown.

Slidably arranged through each of the tubular studs 37 of the member 36 is a pin 48 having a portion threaded to receive a clamp nut 49 which bear respectively against the inner ends of the studs 37. At its inner end each of the pins 48 is provided with a yoke 50, through which the forked ends 46—47 of the arms 44—45 extend and engage by their forked portions with the outer member 51 of the yoke 50. The other arm or member of the bell crank lever 44 is perforated to receive one end of a spring 52, while the opposite end of the spring is connected into one of the apertures 43 of the member 41. The other arm of the bell crank lever 45 is perforated to receive one end of the spring 53, the opposite end of the latter spring being connected into the aperture 42 of the nearest member 41. By this arrangement the rim 35 is yieldably coupled at numerous points with the inner rim 34, and an efficient spring rim wheel thereby produced. It will be noted that the strain upon the springs is outwardly, or that the springs are subjected to a pulling force, and that the vehicle body is thus suspended by the springs. By this means it will be obvious that jars and concussions are readily absorbed by the springs and not communicated to the body.

As before stated the sides of the U-shaped outer rim 35 overlap the sides of the inner rim 34, and the outer rim is arranged to move over the inner rim when the springs are compressed under the weight of the body of the vehicle, as will be obvious.

Fitting through the sides of the outer rim 35 at suitable intervals are threaded plugs 54, each plug having a squared outer portion to receive a wrench to enable the blocks to be inserted and removed. Formed within the inner face of each of the plugs 54 are a plurality of radial recesses 18, each recess having half sockets 19 in its sides to receive trunnions or studs 20 upon bearing balls 55, each recess being thus arranged to receive one of the bearing balls. Fitting over each portion of the plug 54, which is located between the recesses 18, is a bearing plate 22, each bearing plate having opposing half bearings which fit over the outer portions of the trunnions 20 of the bearing balls. By this means each of the plates 22 supports two of the studs or trunnions 20, and thus holds the bearing balls in position free to rotate within the recesses. A larger ball 56 is supported upon each group of the bearing balls and bears against the outer face of the rim 34, as shown. By this means a plurality of anti-friction bearing devices are produced which reduce the friction between the parts 34 and 35. One of the sides of the outer rim 35 is detachable, as represented at 57, and secured in place by clamp bolts 58 or other suitable fastening devices, so that the two rim members may be united, and also providing means for ready access to the interior of the wheel rim when required for removing impaired or broken parts.

It will be noted by this arrangement that the tension of the springs 52—53 may be readily controlled by simply manipulating the clamp nuts 49 to move the pins 48, together with their yokes 50—51, against the bell crank levers 44—45. The nuts 49 being accessible from the inside of the wheel, the tension is readily controlled without removing any of the parts. The outer face of the outer rim 35 is formed with an annular channel 59 to receive and support a tire member 60, of rubber or like material.

In Fig. 8 is shown a slight modification in the construction of the outer rim member 35, which consists in dispensing with the channel 59 and forming the outer portion of increased thickness, as shown at 61. By this means the wheel is provided with a relatively heavy outer tire of metal instead of the rubber tire shown in Figs. 1 and 2.

Attached to the side members of the outer rim 57 are a plurality of loops 62 to receive straps whereby a chain structure may be attached when traveling over muddy roads or in climbing hills.

The improved device is simple in construction, can be manufactured of any suitable size to correspond to the strains or weight which the vehicle is designed to carry, and is adapted equally for the lightest buggies or heaviest draft vehicles, but as before stated the improved device is especially adapted for use in connection with automobiles and similar vehicles.

All of the parts may be made of metal, but generally the spokes 16 will be of wood, but the spokes may also be of metal if preferred.

Having thus described the invention, what is claimed as new is:

1. A wheel including an inner rim, an outer rim spaced from the inner rim, a plurality of supporting devices spaced apart and connected to the outer rim, a plurality of supporting devices spaced apart and connected to the inner rim and located opposite the spaces between the supporting devices of the outer rim, a pair of bell crank levers connected to swing at their elbows to said inner supporting devices, springs connected respectively to the supporting devices of the outer rim and one member of said bell crank levers, and means operating upon the other member of the bell crank levers to control the tension of the springs.

2. A wheel including an inner rim, an outer rim spaced from the inner rim, a plurality of bell crank levers each mounted to swing at its elbow relative to one of said rims, springs connected respectively to one member of said levers and to the other of said rims, and means operating upon the other of said bell crank members to control the tension of said springs.

3. A wheel including an inner channeled rim, an outer channeled rim with its sides slidable relative to the sides of the inner rim, a plurality of supporting devices connected to the inner rim, a pair of bell crank levers swinging at their elbows upon each of said supporting devices, springs connected respectively to the outer rim and to one of the members of the bell crank levers, a rod slidable through each of said supporting devices and having a yoke at one end for engaging the other members of each pair of said bell crank levers, and means for adjusting said rods.

In testimony whereof, I affix my signature in presence of two witnesses.

GUNDER B. LIVINGSTON. [L. S.]

Witnesses:
 THOS. P. STAIR,
 H. J. JOHNSON.

---

Copies of this patent may be obtained for five cents each, by addressing the "Commissioner of Patents, Washington, D. C."